US00RE38756E

(19) United States
(12) Reissued Patent
Kraus et al.

(10) Patent Number: US RE38,756 E
(45) Date of Reissued Patent: Jul. 12, 2005

(54) VIBRATORY DISTRIBUTION CONVEYOR

(75) Inventors: Richard B. Kraus, Barrington, IL (US); Edward Steffes, Jr., Woodstock, IL (US); Claude T. Guenther-Hutchens, McHenry, IL (US); Dean C. Bichler, Crystal Lake, IL (US)

(73) Assignee: General Kinematics Corporation, Barrington, IL (US)

(21) Appl. No.: 10/235,732

(22) Filed: Sep. 5, 2002

Related U.S. Patent Documents

Reissue of:
(64) Patent No.: 6,112,883
Issued: Sep. 5, 2000
Appl. No.: 09/128,878
Filed: Aug. 4, 1998

(51) Int. Cl.[7] ..... B65G 27/08
(52) U.S. Cl. ..... 198/764; 198/763; 198/770; 198/771
(58) Field of Search ..... 198/752.1, 759, 198/760, 763, 764, 766, 770, 771

(56) References Cited

U.S. PATENT DOCUMENTS 1,720,131 A * 7/1929 Lemont ..... 198/771
2,968,424 A * 1/1961 Lawson ..... 222/161
3,581,871 A * 6/1971 Forman ..... 222/55
3,628,648 A * 12/1971 McClusky ..... 198/383
3,954,169 A 5/1976 Clark
4,218,929 A * 8/1980 Spurlin ..... 74/61
4,369,874 A 1/1983 Kettner et al.
5,056,652 A * 10/1991 Kraus et al. ..... 198/760
5,120,190 A 6/1992 Smith et al.

* cited by examiner

*Primary Examiner*—Khoi H. Tran
(74) *Attorney, Agent, or Firm*—Marshall, Gerstein & Borun LLP

(57) ABSTRACT

In order to provide the capability of distributing a material that is conveyed, a vibratory distribution conveyor includes a deck having a distribution edge. The distribution edge extends between an inlet end and an end remote therefrom and the deck is subjected to vibratory motion to cause material to be conveyed from the inlet end toward the end remote therefrom. With this arrangement, the declination of the deck is controlled about a longitudinal axis to control the distribution characteristics of the conveyor.

28 Claims, 4 Drawing Sheets

VIBRATORY DISTRIBUTION CONVEYOR

Matter enclosed in heavy brackets [ ] appears in the original patent but forms no part of this reissue specification; matter printed in italics indicates the additions made by reissue.

FIELD OF THE INVENTION

The present invention is generally related to vibratory conveyors and, more particularly, a vibratory conveyor for distributing materials from a distribution edge thereof

BACKGROUND OF THE INVENTION

As is well known in the art, vibratory conveying equipment has been developed to satisfy a wide range of diverse applications. It is oftentimes the case that a system for handling any of a variety of different materials will include, as an integral component, a vibratory conveyor for conveying the material from a first to a second location. At the second location, there may be a need for distributing the material rather than depositing the material at a single point.

In one particular application, a vibratory distribution conveyor may be advantageously utilized for handling sprue which is a necessary byproduct of production in a foundry. The sprue is a crude, irregular waste material that may not be readily susceptible to being conveyed to a single point for later handling for recycling. On the contrary, the nature of sprue is such that it should be conveyed and deposited in a distributed manner rather than conveyed and deposited into a pile at the end of the conveyor.

More specifically, the sprue may have sharp and irregular edges and may be of different sizes and shapes. It is easier to handle the sprue if it is conveyed from a first location to a distributed handling location, i.e., a location where it is longitudinally separated. Unfortunately, there has been no such vibratory conveyor capable of doing this in an acceptable manner.

While the requirements for the handling of sprue are described herein, it will be appreciated that there are many other material conveying operations that may have similar requirements. It is well known in the vibratory conveying field that many materials must be conveyed from a first location to a later-handling location in a manner that can be most expediently accomplished utilizing a vibratory conveyor. In most if not all such applications, it is necessary or desirable for the transfer of the material from the first location to the later-handling location to be accomplished in a suitably controlled manner.

The present invention is directed to overcoming one or more of the foregoing problems and achieving one or more of the resulting objects.

SUMMARY OF THE INVENTION

It is an object of the present invention to provide a vibratory material distributor which includes a conveyor and means for vibrating the conveyor. It is also an object of the present invention to provide a vibratory distribution conveyor in which a deck has an inlet end and a distribution edge extending between the inlet end and an end remote therefrom. It is a further object of the present invention to control the declination of the deck about an axis extending from the inlet end to the end remote therefrom.

Accordingly, the present invention is directed to vibratory distribution conveyor comprising a deck having an inlet end and a distribution edge extending between the inlet end and an end remote therefrom. The conveyor also includes means for imparting vibratory motion to cause material on the deck to be conveyed from the inlet end toward the end remote therefrom and means for controlling declination of the deck about an axis extending from the inlet end to the end remote therefrom. In the exemplary embodiment, the deck is supported by a plurality of links and a plurality of springs extending from a rigid support surface at an obtuse angle and an acute angle to the deck, respectively.

In a preferred embodiment, the vibratory motion imparting means produces a resultant force which is suitably disposed at an oblique angle to the deck of the vibratory distribution conveyor. It is advantageous to achieve this by utilizing a motor driven eccentric mass system associated with the deck for causing material on the deck to be conveyed from the inlet end toward the end remote therefrom. As for the resultant force, the oblique angle is such that there is a vertically upward force component and a horizontally forward force component which is produced by the motor driven eccentric mass system.

As for other details, the links preferably extend from the rigid support surface at an obtuse angle to the deck and the springs preferably extend from the rigid support surface at an acute angle to the deck. It is also advantageous for there to be a pivotable connection between the generally linear, planar conveying surface of the deck and a frame member disposed below the deck to accommodate pivoting movement of the deck about a longitudinal axis. As for the declination controlling means, it preferably includes an inflatable and deflatable bag located below the deck on the side opposite the distribution edge to control the angle of declination relative to the longitudinal axis.

In a highly preferred embodiment, the vibratory distribution conveyor is such that the deck comprises a generally linear, planar conveying surface extending parallel to the longitudinal axis. The conveying surface advantageously includes an upstanding wall which is located opposite the distribution edge and which serves to keep material from falling from the deck except along the distribution edge. As for the pivotable connection, it is preferably defined by a first yoke member which is rigidly mounted to the deck and a second yoke member which is rigidly mounted to the frame.

In a most highly preferred embodiment, the pivotable connection further includes a compressible spacer disposed between and in contact with the first and second yoke members and a fastener joining the first and second yoke members for slight relative pivotal movement within limits defined at least in part by the compressible spacer. It is advantageous for the compressible spacer to be generally donut or toroid shaped with the fastener comprising a bolt extending through the first and second yoke members and the compressible spacer and with a nut threadingly engaged with the bolt for tightening and loosening the connection between the first and second yoke members to increase and decrease torsional resistance to movement of the compressible spacer. With this arrangement, the inflatable and deflatable bag preferably is located below the deck beneath the generally linear, planar conveying surface and is disposed opposite the distribution edge where it is carried by first and second mounting bracket which are secured to the deck and the frame member disposed beneath the deck.

Additionally, the links and springs are preferably provided in grouped pairs with each of the grouped pairs being arranged such that the link and the spring of each pair are joined in substantially adjacent relation to the frame member with the links each advantageously having one end pivotally connected to the rigid support surface and the other end pivotally mounted to the frame member beneath the deck to accommodate a reciprocating motion of the deck imparted by the motor driven eccentric mass system and resisted by the springs. Still additionally, the motor driven eccentric mass system preferably includes a motor mounted to the rigid support structure, an eccentric mass carried by a shaft mounted to the rigid support structure in close proximity to the motor, a coupling for rotating the shaft with the motor to cause the eccentric mass carried by the shaft to rotate about the axis of the shaft, and a resistent connection of the eccentric mass to the frame member for producing the resultant force for the conveying material on the conveying surface of the deck.

Other objects advantages and features of the present invention will become apparent from a consideration of the following specification taken in conjunction with the accompanying drawings.

DETAILED DESCRIPTION OF THE PREFERRED EMBODIMENT

Figure 1:
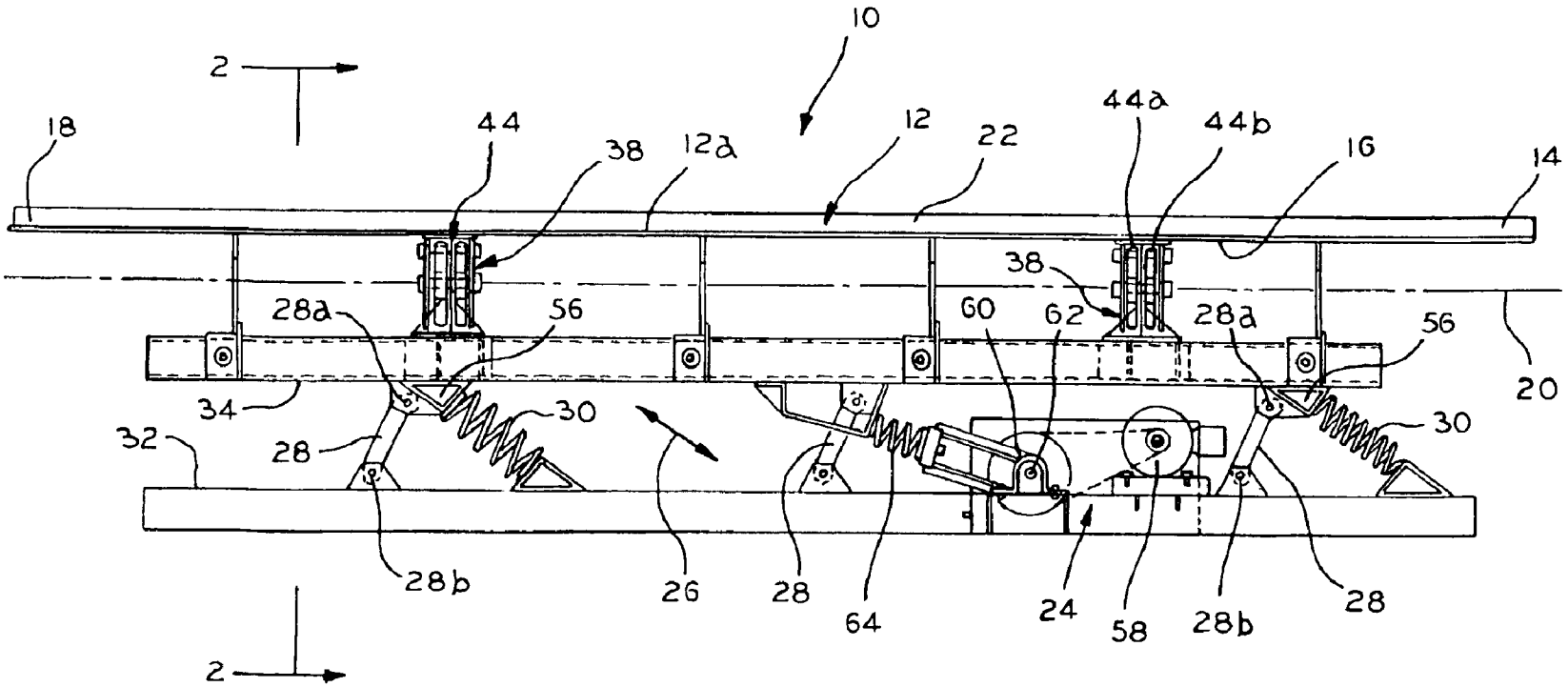
FIG. 1 is a side elevational view of a vibratory distribution conveyor in accordance with the present invention.

In the illustration given, and with reference first to FIG. 1, the reference numeral 10 designates generally a vibratory distribution conveyor in accordance with the present invention. The conveyor 10 includes a deck 12 having an inlet end 14 and a distributing edge 16 extending between the inlet end 14 and an end 18 remote therefrom. The deck 12 comprises a generally linear, planar conveying surface 12a extending parallel to a longitudinal axis 20, and it has an upstanding wall 22 opposite the distribution edge 16 (see, also, FIGS. 2 and 3). The conveyor 10 also includes a motor driven eccentric mass system generally designated 24 which produces a resultant force generally represented by the doubleheaded arrow 26 disposed at an oblique angle to the conveying surface 12a of the deck 12. In this connection, the resultant force has vertically upward and horizontally forward force components to cause material on the deck 12 to be conveyed from the inlet end 14 toward the end 18 remote therefrom.

Figure 2:
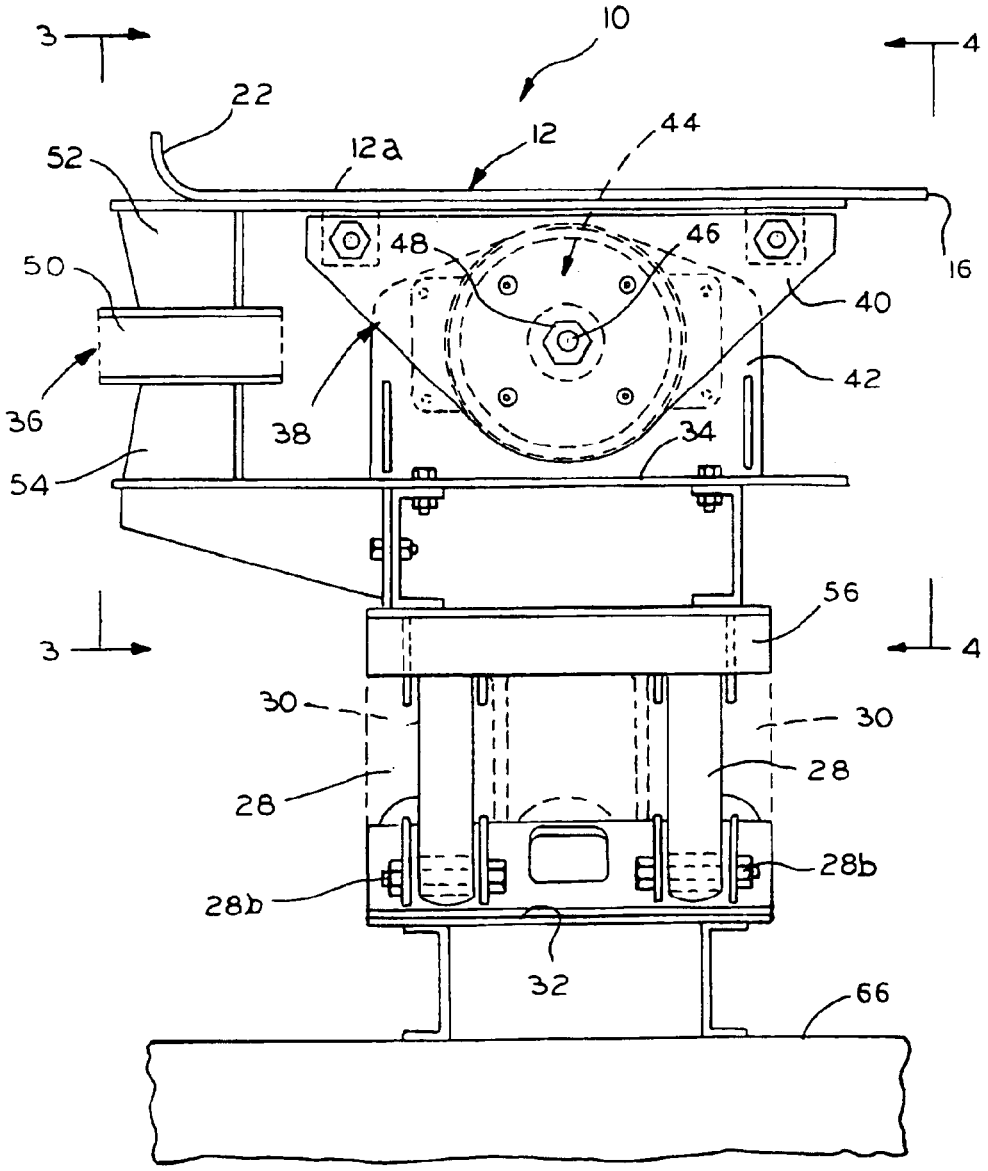
FIG. 2 is a cross-sectional view taken generally along the line 2—2 of FIG. 1.

As shown in FIGS. 1 and 2, the deck 12 is supported by a plurality of links 28 and a plurality of springs 30 wherein the links 28 extend at an obtuse angle from a rigid support surface 32 to a frame member 34 which is disposed beneath the deck 12. The springs 30 will be seen to extend at an acute angle from the rigid support surface 32 to the frame member 34. In addition, the conveyor 10 includes means generally designated 36 for controlling declination of the distribution edge 16 of the deck 12 in relation to the generally linear, planar conveying surface 12a about the longitudinal axis 20 (see FIG. 3).

As shown in FIGS. 1 and 2, the conveyor 10 includes a pivotable frictional connection 38 between the generally linear, planar conveying surface 12a of the deck 12 and the frame member 34 to accommodate pivoting movement of the deck 12 about the longitudinal axis 20. The pivotable connection 38 is defined by a first yoke member 40 rigidly mounted to the deck 12 and a second yoke member 42 rigidly mounted to the frame member 34 and further includes a compressible spacer 44. The compressible spacer 44 is disposed between and in contact with the first and second yoke members 40 and 42 and a fastener 46 joins the first and second yoke members 40 and 42 in a manner permitting slight relative pivotal movement within limits defined at least in part by the characteristics of the compressible spacer 44. With this arrangement, the compressible spacer 44 is generally donut or toroid shaped, the fastener 46 comprises a bolt extending through the first and second yoke members 40 and 42 and the donut or toroid shaped compressible spacer 44, and a nut 48 threadingly engages the bolt 46.

With the foregoing construction, it will be appreciated that the nut 48 on the bolt 46 may be utilized to tighten and loosen the connection between the first and second yoke members 40 and 42 to increase and decrease torsional resistance to movement of the compressible spacer 44 on the first and second yoke members 40 and 42.

Figure 4:
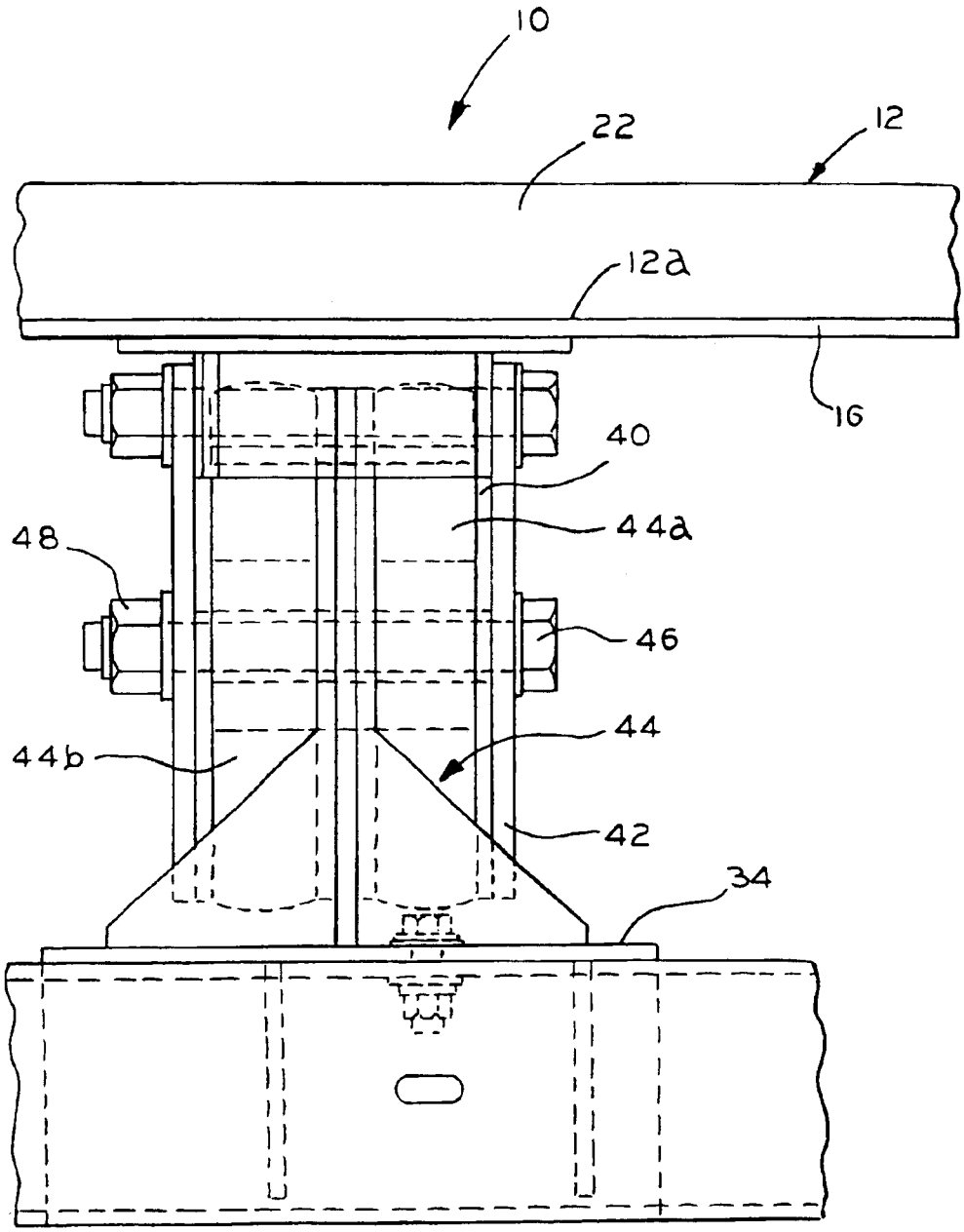
FIG. 4 is a partial side elevational view taken generally along the line 4—4 of FIG. 2

In the preferred embodiment shown in FIG. 1, the conveyor 10 includes a pair of first and second yoke members 40 and 42 disposed oppositely of the motor driven eccentric mass system 24 with each of the pairs of first and second yoke members 40 and 42 having a donut or toroid shaped compressible spacer 44 therebetween. It may be advantageous for the compressible spacer 44 to actually comprise a pair of such spacers 44a and 44b, as shown in FIGS. 1 and 4, to provide a highly effective means for increasing and decreasing torsional resistance to movement of the first and second yoke members 40 and 42 between which the compressible spacers 44a and 44b are suitably disposed. In any event, the torsional resistance provided by the compressible spacers such as 44a and 44b can be controlled as desired in a particular application by tightening and loosening the connection between the first and second yoke members 40 and 42 in conventional fashion utilizing the nut 48 and bolt 46 as previously described (see FIG. 4).

Figure 3:
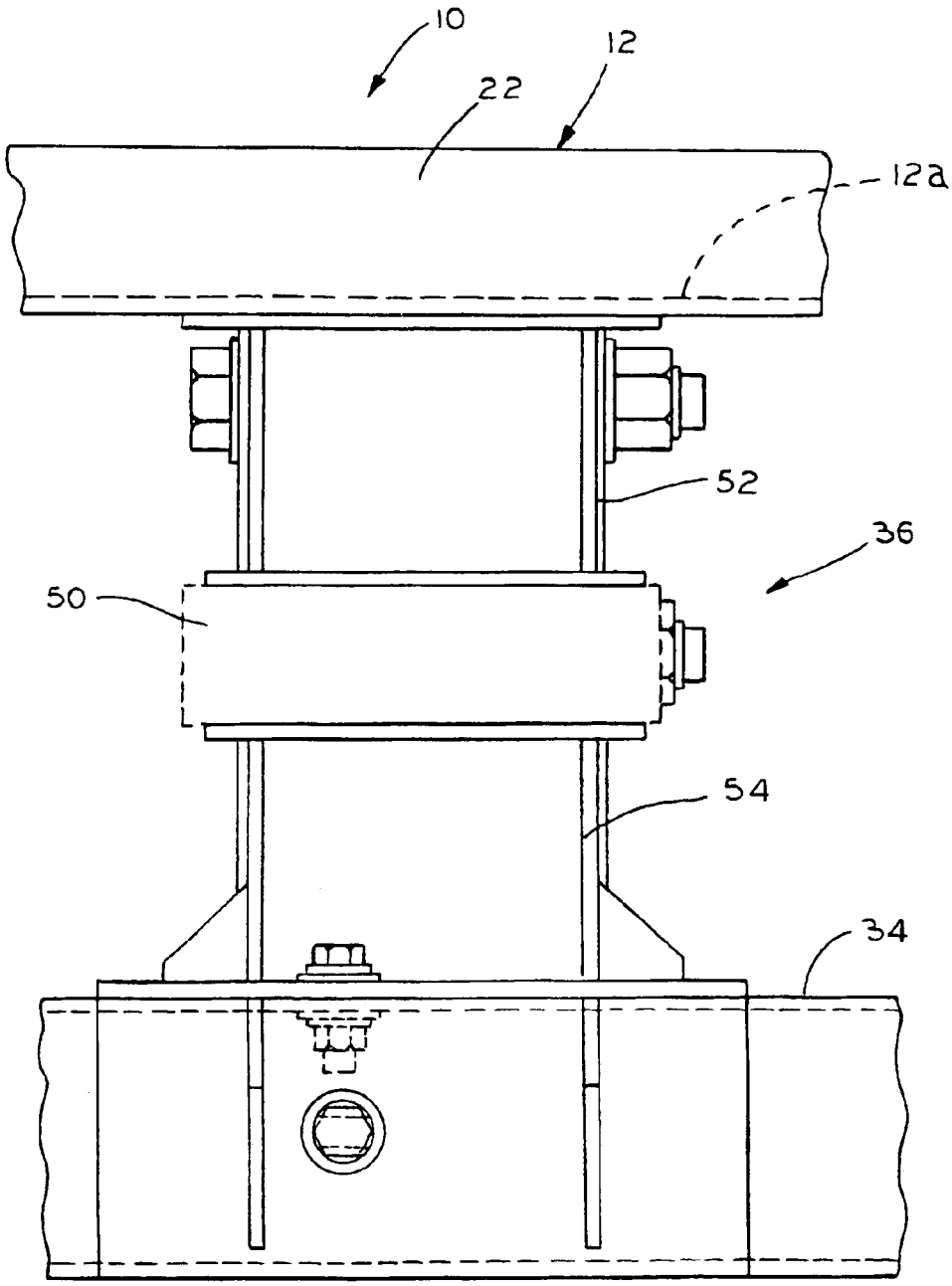
FIG. 3 is a partial side elevational view taken generally along the line 3—3 of FIG. 2.

Referring now to FIGS. 2 and 3, the declination controlling means 36 includes an inflatable and deflatable bag 50 located below the deck 12 beneath the generally linear, planar conveying surface 12a on the side of the deck 12 opposite the distribution edge 16 to control the angle of declination relative to the longitudinal axis 20. It will be appreciated that, in the preferred embodiment, the conveyor 10 will include a pair of inflatable and deflatable bags such as 50 which suitably comprise pneumatic springs located below the deck 12 beneath the generally linear, planar conveying surface 12a thereof, although a potential alternative embodiment would involve using hydraulic springs in place of the pneumatic springs. In this connection, the inflatable and deflatable bags 50 are preferably disposed at spaced locations, which may correspond to the locations of the pivotable connection 38, opposite the distribution edge 16 with each of the bags 50 being carried by first and second mounting brackets 52 and 54 secured to the deck 12 and the frame member 34, respectively.

As with the pivotable connections 38 and the bags 50, the links and springs 28 and 30 are preferably provided in grouped pairs with each of the grouped pairs being arranged such that the link 28 and the corresponding spring 30 are joined in substantially adjacent relation as at 56 to the frame member 34. The links 28 each have one end 28a pivotally mounted to the rigid support surface 32 and the other end 28b pivotally mounted to the frame member 34 to accommodate a reciprocating motion of the deck 12 imparted by the motor driven eccentric mass system 24 and resisted by the springs 30. The motor driven eccentric mass system 24 preferably includes a motor 58 mounted to the rigid support structure 32, an eccentric mass 60 carried by a shaft 62 mounted to the rigid support surface 32 With this arrangement the motor 58 causes the eccentric mass 60 to rotate about the axis of the shaft 62, and a resilient connection to the frame member 34 is provided as by the spring 64 causing the resultant force represented by the doubleheaded arrow 26 to be produced.

From the foregoing description of an eccentric mass system which is of a type that is conventional in the art, it will be appreciated how vibratory conveying forces are produced for conveying material on the deck 12.

As will be appreciated from FIG. 2, the rigid support structure 32 comprises a first beam or beam composite mounted to a rigid surface such as a floor 66 and the frame member 34 comprises a second beam or beam composite mounted above the first beam or beam composite. As will also be appreciated from FIG. 1, the distribution edge 16 comprises a linear edge of the generally linear, planar conveying surface 12a of the deck 12 extending substantially entirely from the inlet end 14 to the opposite end 18 for distributing conveyed materials therealong.

As will be appreciated from the foregoing, the present invention is well suited for conveying materials which are to be distributed along a generally linear conveying path. The characteristics of the vibratory distribution conveyor 10 can be varied in several ways such as increasing and decreasing torsional resistance to movement of the compressible spacers 44, controlling the angle of declaration of the generally linear, planar conveying surface 12a between positive and negative angles about the longitudinal axis 20 extending centrally through the pivotable connections 38 by utilizing the inflatable and deflatable bags 50, varying the characteristics of the motor 58 and eccentric mass 60, and changing the length of the links 28 and the spring constant characteristics of the springs 30 and 64. As a result, the vibratory distribution conveyor 10 finds wide ranging applicability with the operating characteristics fully capable of complete control depending upon requirements.

From the foregoing, it will be appreciated that the vibratory distribution conveyor 10 permits control over the material distribution characteristics of the deck 12 through the declination controlling means 36 and the frictional connection 38. This makes it possible to distribute a material such as sprue from a foundry to one or more conveyors extending generally transverse to the deck 12 and, while the invention has been described in connection with sprue, the vibratory distribution conveyor is well suited for distributing material ranging in size from small particles to very large materials such as castings and the like. Still more specifically, the vibratory distribution conveyor 10 permits distributing a material from a relative narrow trough defined by the deck 12 to a much wider conveyor or conveyors along the distribution edge 16 of the deck 12.

In this connection, the distribution edge 16 will be understood in the specification and claims to mean not only a free edge of the deck 12 as shown in FIG. 1, but also to mean any longitudinally extending equivalents such as openings along the length of the deck 12 positioned closer to one edge than the other edge thereof. Thus, it would be within the purview of the present invention to have an upstanding wall such as 22 on each of the opposite longitudinal edges of the deck 12 but with selective openings positioned as desired along or near one of the upstanding walls through which a material to be conveyed may pass in a distributed manner as needed for a particular application. With all such arrangements, it is possible to distribute a material that is being conveyed without the need for mechanical components such as plows.

By using compression rubber for the compressible spacers such as 44a and 44b, and subjecting them to torsion through the action of the declination controlling means 36, there is no need for any metal-to-metal component connections. Thus, the present invention makes it possible to avoid the use of mechanical components such as arms, links and the like. However, if desired, it would be possible to utilize a mechanical center pivot construction with a spring return in place of each of the frictional connections 38 described hereinabove.

While in the foregoing there has been set forth a preferred embodiment of the invention, it will be appreciated that the details herein given may be varied by those skilled in the art without departing from the true spirit and scope of the appended claims.

We claim:

1. A vibratory distribution conveyor, comprising:

a deck having an inlet end and a distribution edge extending between the inlet end and an end remote therefrom;

means for imparting vibratory motion to cause material on the deck to be conveyed from the inlet end toward the end remote therefrom; and means for controlling declination of the deck about an axis extending from the inlet end to the end remote therefrom.

2. The vibratory distribution conveyor of claim 1 wherein the vibratory motion imparting means produces a resultant force disposed at an oblique angle to the deck.

3. The vibratory distribution conveyor of claim 1 wherein the deck comprises a generally planar conveying surface having an upstanding wall opposite the distribution edge.

4. The vibratory distribution conveyor of claim 1 wherein the deck comprises a generally linear conveying surface and the axis of declination is a longitudinally extending axis.

5. The vibratory distribution conveyor of claim 1 wherein the vibratory motion imparting means comprises a motor driven eccentric mass system associated with the deck.

6. The vibratory distribution conveyor of claim 1 wherein the deck is supported by a plurality of links extending from a rigid support surface at an obtuse angle to the deck.

7. The vibratory distribution conveyor of claim 1 wherein the deck is supported by a plurality of springs extending from a rigid support surface at an acute angle to the deck.

8. The vibratory distribution conveyor, comprising:

a deck having an inlet end and a distribution edge extending between the inlet end and an end remote therefrom, the deck comprising a generally linear conveying surface extending along a longitudinal axis, the deck further comprising a generally planar conveying surface having an upstanding wall opposite the distribution edge;

a motor driven eccentric mass system associated with the deck for causing material on the deck to be conveyed from the inlet end toward the end remote therefrom; and means for controlling declination of the distribution edge of the deck in relation to the generally linear, planar conveying surface of the deck about the longitudinal axis.

9. The vibratory distribution conveyor of claim 8 wherein the motor driven eccentric mass system produces a resultant force at an oblique angle to the deck having a vertically upward force component and a horizontally forward force component.

10. The vibratory distribution conveyor of claim 8 wherein the deck is supported by a plurality of links extending from a rigid support surface at an obtuse angle to the deck and by a plurality of springs extending from the rigid support surface at an acute angle to the deck.

11. The vibratory distribution conveyor of claim 8 including a pivotable connection between the generally linear, planar conveying surface of the deck and the motor driven eccentric mass system to accommodate pivoting movement of the deck about the longitudinal axis.

12. The vibratory distribution conveyor of claim 8 wherein the declination controlling means includes an inflatable and deflatable bag located below the deck on the side opposite the distribution edge to control the angle of declination relative to the longitudinal axis.

13. The vibratory distribution conveyor, comprising:

a deck having an inlet end and a distribution edge extending between the inlet end and an end remote therefrom, the deck comprising a generally linear conveying surface extending along a longitudinal axis, the deck further comprising a generally planar conveying surface having an upstanding wall opposite the distribution edge;

a motor driven eccentric mass system producing a resulting force at an oblique angle to the deck having a vertically upward force component and a horizontally forward force component for causing material on the deck to be conveyed from the inlet end toward the end remote therefrom;

the deck being supported by a plurality of links extending at an obtuse angle from a rigid support surface to a frame member disposed beneath the deck and also being supported by a plurality of springs extending at an acute angle from the rigid support surface to the frame member disposed beneath the deck; and means for controlling declination of the distribution edge of the deck in relation to the generally linear, planar conveying surface of the deck about the longitudinal axis.

14. The vibratory distribution conveyor of claim 13 including a pivotable frictional connection between the generally linear, planar conveying surface and the frame member to accommodate pivoting movement of the deck about the longitudinal axis and wherein the declination controlling means includes an inflatable and deflatable bag located below the deck beneath the generally linear, planar conveying surface on the side of the deck opposite the distribution edge to control the angle of declination relative to the longitudinal axis.

15. The vibratory distribution conveyor of claim 14 wherein the pivotable frictional connection is defined by a first yoke member rigidly mounted to the deck and a second yoke member rigidly mounted to the frame member, the pivotable frictional connection further including a compressible spacer, the compressible spacer being disposed between and in contact with the first and second yoke members, and a fastener joining the first and second yoke members for slight relative pivotal movement within limits defined at least in part by the compressible spacer.

16. The vibratory distribution conveyor of claim 15 wherein the compressible spacer is formed of generally donut or toroid shaped compression rubber, the fastener comprises a bolt extending through the first and second yoke members of the donut or toroid shaped compressible spacer and a nut threadingly engaged with the bolt for tightening and loosening the connection between the first and second yoke members, the nut and bolt permitting the connection to be tightened and loosened to increase and decrease torsional resistance to movement of the compressible spacer.

17. The vibratory distribution conveyor of claim 16 further including a pair of first and second yoke members each of which has a donut or toroid shaped compressible spacer therebetween, and further including a pair of inflatable and deflatable bags located below the deck beneath the generally linear, planar conveying surface, the inflatable and deflatable bags being disposed at spaced locations opposite the distribution edge and each of the bags being carried by first and second mounting brackets secured on the deck and frame member, respectively.

18. The vibratory distribution conveyor of claim 17 wherein the links and springs are provided in grouped pairs with each of the grouped parts being arranged such that the link and the spring of each pair are joined in substantially adjacent relation to the frame member, and the links each have one end pivotally mounted to the rigid support surface and the other end pivotally mounted to the frame member to accommodate a reciprocating motion of the deck imparted by the motor driven eccentric mass system and resisted by the springs.

19. The vibratory distribution conveyor of claim 18 wherein the motor driven eccentric mass system includes a motor mounted to the rigid support structure, an eccentric mass carried by a shaft mounted to the rigid support structure in close proximity to the motor, a coupling for rotating the shaft with the motor to cause the eccentric mass carried by the shaft to rotate about the axis of the shaft, and a resilient connection to the frame member for producing the resultant force for conveying material on the conveying surface of the deck.

20. The vibratory distribution conveyor of claim 19 wherein the rigid support structure is a first beam mounted to a rigid surface and the frame member is a second beam mounted above the first beam, the distribution edge comprising a linear edge of the generally linear, planar conveying surface of the deck extending substantially entirely from the inlet end to the opposite end for distributing conveyed materials therealong.

*21. A vibratory distribution conveyor, comprising:*

*a deck having an inlet end and an end remote therefrom, the deck also having a material distribution edge between the inlet end and the end remote therefrom;*

*an eccentric mass system for imparting vibratory motion to the deck to cause material to be conveyed from the inlet end toward the end remote therefrom; and*

*means for controlling declination of the material distribution edge of the deck to cause material being conveyed from the inlet end to be distributed therefrom.*

*22. The vibratory distribution conveyor of claim 21 wherein the eccentric mass system is motor driven and produces a resultant force disposed at a generally oblique angle to the deck.*

*23. The vibratory distribution conveyor of claim 21 wherein the deck comprises a generally linear conveying surface supported by a plurality of springs extending from a rigid support surface.*

*24. The vibratory distribution conveyor of claim 21 wherein the deck comprises a generally planar conveying surface supported by a plurality of springs extending from a rigid support surface.*

*25. A vibratory distribution conveyor, comprising:*

*a deck having an inlet end and a distribution edge;*

*means for imparting vibratory motion to cause material on the deck to be conveyed from the inlet end to the distribution edge; and*

*means for controlling declination of the distribution edge.*

*26. The vibratory distribution conveyor of claim 24 wherein the deck is supported by a plurality of springs extending from a rigid support surface.*

*27. A vibratory distribution conveyor, comprising:*

*a deck having an inlet end and a distribution edge;*

*an eccentric mass system for causing material placed on the deck at the inlet end to be conveyed by vibratory motion to the distribution edge; and*

*a controller for controlling declination of the distribution edge.*

*28. The vibratory distribution conveyor of claim 26 wherein the deck is supported by a plurality of springs extending from a rigid support surface.*

* * * * *

UNITED STATES PATENT AND TRADEMARK OFFICE

CERTIFICATE OF CORRECTION

PATENT NO. : RE 38,756 E
DATED : July 12, 2005
INVENTOR(S) : Richard B. Kraus et al.

It is certified that error appears in the above-identified patent and that said Letters Patent is hereby corrected as shown below:

Column 8,
Line 19, please delete “parts” and insert -- pairs --.

Signed and Sealed this

Twenty-seventh Day of September, 2005

JON W. DUDAS
*Director of the United States Patent and Trademark Office*